United States Patent [19]

Inokuchi et al.

[11] 4,213,635
[45] Jul. 22, 1980

[54] TWO-STAGE AIR BAG SYSTEM

[75] Inventors: Nobuyuki Inokuchi, Toyota; Kouzo Hamada, Okazaki, both of Japan

[73] Assignee: Toyota Kodosha Kogyo Kabushiki Kaisha, Toyota, Japan

[21] Appl. No.: 960,005

[22] Filed: Nov. 13, 1978

Related U.S. Application Data

[63] Continuation of Ser. No. 807,328, Jun. 16, 1977, abandoned.

[51] Int. Cl.$^2$ ............................................. B60R 21/08
[52] U.S. Cl. .................................... 280/737; 280/742; 200/82 R
[58] Field of Search ............... 280/734, 735, 736, 737, 280/740, 741, 742, 728; 200/82 C, 82 R; 180/103 A

[56] References Cited

U.S. PATENT DOCUMENTS

| 2,902,557 | 9/1959 | Brockman | 200/82 C |
| 2,951,131 | 8/1960 | Lancier | 200/82 R |
| 3,744,815 | 7/1973 | Scherenberg | 280/735 |
| 3,868,126 | 2/1975 | Radke | 180/103 A |
| 3,966,228 | 6/1976 | Neuman | 280/737 |
| 4,050,483 | 9/1977 | Bishop | 280/737 |

FOREIGN PATENT DOCUMENTS 1129179  10/1968  United Kingdom ................. 200/82 R

*Primary Examiner*—John P. Silverstrim
*Attorney, Agent, or Firm*—Koda and Androlia

[57] ABSTRACT

A two-stage air bag system which includes an air bag, a first pressure device for supplying first stage expansive pressure to the air bag when an impact is detected, a second pressure device for supplying second stage expansive pressure to the air bag and a delayed ignition signal generator responsive to the magnitude of the first stage expansive pressure for activating the second pressure device when the magnitude of the first stage expansive pressure exceeds a predetermined value.

2 Claims, 2 Drawing Figures

TWO-STAGE AIR BAG SYSTEM

This is a continuation of application Ser. No. 807,328, filed June 16, 1977 now abandoned.

BACKGROUND OF THE INVENTION

1. Field of Invention

This invention relates to air bag restraining systems for motor vehicles and more particularly, to two-stage air bag restraining systems for motor vehicles.

2. Prior Art

Air bags are well known in the art as a means for easing impacts of a collision to motor vehicle passengers. The air bag, therefore, must be activated immediately at the moment of collision and a short inflating time is desirable. On the other hand, if the air bag inflates too rapidly, the passenger is injured by the inflating air bag. For example, assume that a child is standing on the passenger seat in front of the instrument panel. If the air bag is activated, the sudden and rapid inflation of the bag would throw the child off the seat and in all probability cause serious injury to the child. In order to prevent such injury by the inflating air bag, it is necessary that the inflating speed of the bag be reduced. Therefore, the two-stage air bag device has been proposed in order to satisfy both of these contradictory requirements as described above.

The two-stage air bag device works such that the air bag is inflated to a predetermined level during the initial stage of the collision and after a brief interval it is inflated completely. In prior art air bag devices, a predetermined amount of gas is generated in the initial stages of collision so as to inflate the air bag to some degree. A great quantity of gas is then generated after an interval established somewhere between several milliseconds to several tens of milliseconds. With such a two-stage air bag device, the passenger is lightly pressed into the seat and is able to maintain a safe position during the first stage expansion. It is the second stage or main expansive action which absorbs the impact completely.

The time interval between the first stage expansion and the second stage expansion is set in relation to the quantity of gas used in the first stage and other factors. However, an improper interval adversely affects the air bag as a safety device. For example, if the interval is too short, it will cause the injury by inflating air bag but if the interval is too long, the shock absorption action of the air bag will be weakened. For this reason, a high degree of precision is required for the delayed ignition signal generator whose function it is to activate the first pressure device and thereafter the second pressure device.

A typical conventional delayed ignition signal generator is made up of a delay circuit, etc. employing complex electronic circuitry. Because of the complexity of the system and the attended high cost, its applicability to such infrequently used devices such as air bags, is limited. A typical prior art device is equipped with at least two acceleration sensors wherein the first sensor activates a first pressure device upon detection of a collision and thereafter deceleration speed of the vehicle is measured by a second sensor which in turn activates a second pressure device. In addition to the need for two sensors, the prior art device has another drawback in that the effectiveness of the air bag device is adversely affected by the relatively imprecise sensors which cannot provide a stable delay time.

SUMMARY OF THE INVENTION

Accordingly, it is a general object of the present invention to provide a two-stage air bag system capable of providing a very stable time interval between the first-stage expansion and the second-stage expansion of the air bag.

It is another object of the present invention to provide a two-stage air bag system which utilizes only a single acceleration sensor.

In keeping with the principles of the present invention, the objects are accomplished by a two-stage air bag system of the type including an air bag for restraining a motor vehicle passenger during impact, a first pressure device for supplying first-stage expansive pressure to the air bag when an impact is detected, a second pressure device for supplying second-stage expansive pressure to the air bag and a means responsive to the magnitude of the first-stage expansive pressure for activating the second pressure device when the magnitude of the first-stage expansive pressure exceeds a predetermined value.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which.

DETAILED DESCRIPTION OF THE INVENTION

Figure 1:
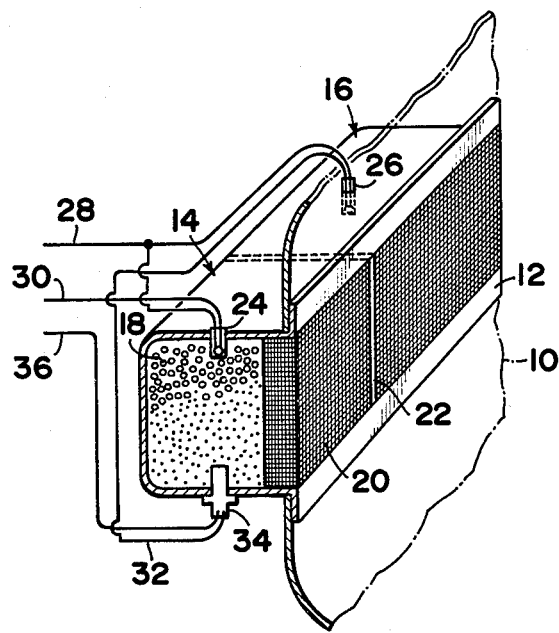
FIG. 1 is a perspective view of a pyrotechnical-type of two-stage air bag system in accordance with the teachings of the present invention.

Referring more particularly to the drawings, shown in FIG. 1 are the principal parts of a pyrotechnical-type of two-stage air bag system in accordance with the teachings of the present invention. The two-stage air bag system of FIG. 1 is stored in a suitable location within the automobile. The two-stage air bag system includes a bag 10, only shown partially in FIG. 1. In a sidewall of air bag 10 is provided a box 12 containing a pressure device therein. The pressure device is divided into two blocks, a first pressure device 14 and a second pressure device 16. The first pressure device is filled with a gas producing material 18 and a filter 20 is disposed at the opening of box 12 into air bag 10. The configuration of the second pressure device 16 is similar to that of the first pressure device and therefore will not be described. A dividing wall 22 is firmly fixed in box 12 between the first pressure device 14 and the second pressure device 16 such that each device is able to generate high pressure gas without interfering with the other.

Igniters 24 and 26 are fixed respectively to the respective sidewalls of the pressure devices 14 and 16. Igniters 24 and 26 contain filaments and priming powder therein. When an ignition signal is given to an igniter 24, an explosive material is ignited by the filament. When the explosive material is ignited by the filament, the gas producing material 18 is caused to burn thereby producing high pressure gas. A lead 28 has three ends which are coupled to igniters 24, 26 and ground respectively and a lead 30 is coupled to the other terminal of igniter 24. The leads 28 and 30 are coupled to a single well known impact detector (not shown) which supplies ignition current to igniter 24 when an impact is detected. The other terminal of igniter 26 is coupled via lead 32 to a delayed ignition signal generator 34 whose other terminal is coupled via a lead 36 to a power source.

In operation, when the impact of a collision is detected, igniter 24 is ignited and high pressure gas is produced by the gas producing material 18. The high pressure gas produced passes through filter 20 and inflates air bag 10. The pressure level in the air bag 10 is sensed by the delayed ignition signal generator 34. That is to say, that signal generator 34 detects the pressure level of the air bag caused by the first pressure device 14 and when the pressure level reaches a prescribed or predetermined pressure the switch means which is part of the ignition signal generator 34 activates causing ignition current to be supplied to igniter 26. Thereupon, a large quantity of high pressure gas is supplied to air bag 10 from the second pressure device 16 such that the air bag 10 is completely inflated to restrain the passenger during an impact.

Figure 2:
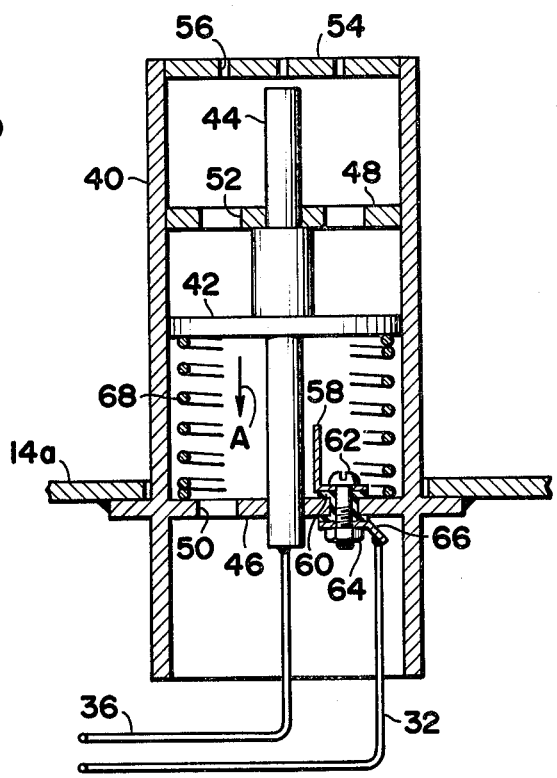
FIG. 2 is a cross-sectional view of a delayed ignition signal generator in accordance with the teachings of the present invention.

Referring to FIG. 2, shown therein is one embodiment of a delayed signal generator 34 in accordance with the teachings of the present invention. A case 40 is fixed to the sidewall 14a of first pressure device 14. The space between the sidewall 14a and case 40 is tightly joined so as to be able to withstand the generating pressure. The case 40 has a generally cylindrical shape. In the present invention, the delayed signal generator 34 may be fixed anywhere in the pressure route of the first pressure device 14, as for example, on filter 20. Case 40 has an activator 42 moveably disposed therein. The activator 42 comprises a piston which slides along the inner wall of case 40. A shaft 44 passes through the activator 42 and is held by wall 46 of case 40 at one end and stopper 48 of case 40 at the other end. The sliding surface between activator 42 and case 40 is air tight such that the pressure is almost completely maintained while sliding motion takes place. An opening 50 is disposed in wall 46 for letting the air out from under the activator 42 when it is in motion. The stopper 48 is inserted into and fixed to case 40 and a hole 52 is provided in the stopper 48. The stopper 48 is preferably fixed to case 40 utilizing a screw member or by a ledge formed inside case 40. An orifice plate 54 is fixed to the open end of case 40. Orifice 56 are formed in orifice plate 54 exposed to the pressure route of first pressure device 14. The pressure generated by the first pressure device 14 passes through the orifices 56, and the number and size of orifices 56 enable to effect on the time interval between the first stage expansion and the second stage expansion.

The delay ignition signal generator 34 includes a switch means which, in the embodiment of FIG. 2, comprises a contact 58 fixed to wall 46 and the activator 42. Contact 58 is fixed to wall 46 by a bolt 62 and nut 64. The contact 58 together with the bolt 62 and nut 64 is insulated from the wall 46 by means of an insulating plate 60. Contact 58 is coupled to lead 32 via lug 66. Lead 32 electrically couples the contact 58 to igniter 26 provided in the second pressure device 16. Lead 36 is coupled to shaft 44 of activator 42. The other end of lead 36 is coupled to an electric power source (not shown). A spring 68 is provided between activator 42 and wall 46 such that activator 42 is held immobile when there is no pressure applied to the signal generator 34. In operation, when the air bag device is inactive, the pressure levels within air bag 10 and in both of the pressure devices 14 and 16 are the same as the atmospheric pressure. Therefore, activator 42 is held immobile by spring 68 as shown in FIG. 2. Accordingly, contact 58 is held immobile such that it does not contact activator 42 and igniter 26 is not ignited. When an impact is detected, first pressure device 14 is activated and supplies high pressure gas to air bag 10. Because of the location of the case 40, the pressure generated by first pressure device 14 passes through the orifices 56 of plate 54 and reaches activator 42 which is caused to move in the direction indicated by arrow A. When the applied pressure reaches a level beyond a predetermined value determined by the tension of spring 68 or the frictional force of activator 42, a contact is made between activator 42 and contact 58 whereupon ignition current is supplied to igniter 26 and the second pressure device 16 supplies the main expansive pressure to air bag 10.

Accordingly, the second pressure device 16 is activated by the pressure applied to activator 42 at the most appropriate moment in an air bag device. In this embodiment, the delaying capability of the delayed ignition signal generator 34 is affected by the properties of activator 42. Moreover, a greater adjustment is achievable by the installation of the orifice plate 54.

As described hereinabove, the present invention provides an effective two-stage inflationary action wherein the second stage expansion is based upon the expansive force of the first stage expansion. Thus, the present invention has the advantages of restraining the passenger during an impact and of preventing any injury by inflating air bag.

In all cases it is understood that the above described embodiments are merely illustrative of but a few of the many possible specific embodiments which represent the applications of the principles of the present invention. Numerous and varied other arrangements can be readily devised by those skilled in the art without departing from the spirit and scope of the invention.

We claim:

1. A two-stage air bag system for a vehicle comprising:
   a housing having one open end, said housing further being divided into two chambers which are adjacent to each other;
   a first pressure device comprising a solid gas producing material provided in one of the two chambers;
   a second pressure device comprising a solid gas producing material provided in another one of the two chambers;
   a first ignition means for igniting said solid material at the first pressure device, said means causing ignition when an emergency condition occurs;
   a filter means provided on said housing enclosing said open ends;
   an air bag coupled to said housing about said open ends;
   a delayed ignition signal generator being provided in said solid gas producing material of said first pressure device in one of said chambers, said delay ignition signal generator comprising a switch means that turns on when a pressure generated by said gas producing material of said first pressure device applied to said switch means exceeds a predetermined value, said switch means comprising:
   a case, a movable contact slidably disposed in said case,
a fixed contact provided in said case, and
a spring means for biasing said movable contact away from said fixed contact; and
a second ignition means responsive to said delayed ignition signal generator for igniting said solid material of said second pressure device.

2. A two-stage air bag system according to claim 1 wherein said case has an orifice plate having a plurality of orifices exposed to an interior of said first pressure device, the number and size of said orifices formed in said orifice plate affecting the time interval between said first stage expansion and said second stage expansion.

* * * * *